(12) United States Patent
Markus et al.

(10) Patent No.: US 9,748,755 B1
(45) Date of Patent: Aug. 29, 2017

(54) CLIP-BASED NON-METALLIC FITTINGS FOR ATTACHMENT OF FLEXIBLE METALLIC CONDUIT

(71) Applicant: Siemens Industry, Inc., Alpharetta, GA (US)

(72) Inventors: Robert Markus, Green Oaks, IL (US); Guy P. Caliendo, Algonquin, IL (US); Samuel Waldmann, Barrington, IL (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 15/272,271

(22) Filed: Sep. 21, 2016

(51) Int. Cl.
*H02G 3/32* (2006.01)
*H02G 15/103* (2006.01)
*H02G 1/14* (2006.01)

(52) U.S. Cl.
CPC ............ *H02G 15/103* (2013.01); *H02G 1/14* (2013.01)

(58) Field of Classification Search
CPC .. H02G 1/00; H02G 3/18; H02G 3/00; H02G 3/02; H02G 3/04; H02G 3/0406; H02G 3/06; H02G 3/0616; H02G 3/0625; H02G 3/0666; H02G 3/0691; H02G 1/04; H02G 15/103; H02G 1/14; H01R 13/5816; H01R 13/73; H01R 13/74; H01R 13/745; H01R 13/741; F16L 7/00
USPC .... 174/40 CC, 68.1, 68.3, 72 R, 72 A, 74 R, 174/88 R, 70 C, 95, 96, 97, 660, 653, 174/654, 655; 248/49, 68.1, 74.2, 56; 285/139.1, 154.1, 149.1, 404
See application file for complete search history.

(56) References Cited

U.S. PATENT DOCUMENTS

| | | | | |
|---|---|---|---|---|
| 2,973,212 A * | 2/1961 | Rose | ................... | H02G 3/0683 174/51 |
| 4,641,863 A * | 2/1987 | Shemtov | .............. | H02G 3/0683 285/154.4 |
| 5,647,613 A * | 7/1997 | Marik | ................... | H02G 3/0691 174/660 |
| 7,126,064 B1 * | 10/2006 | Shemtov | ............. | H02G 3/0666 174/650 |
| 7,154,054 B1 * | 12/2006 | Gretz | ................... | H02G 3/0666 174/653 |
| 8,350,163 B2 * | 1/2013 | Auray | ................. | H02G 3/0691 174/650 |
| 8,476,541 B1 * | 7/2013 | Kiely | ...................... | H02G 3/081 174/656 |
| 8,646,813 B1 * | 2/2014 | Shemtov | ................. | H02G 3/06 174/60 |
| 8,901,441 B2 * | 12/2014 | Sathyanarayana ... | | H02G 3/0691 174/655 |

OTHER PUBLICATIONS

"Anaconda Sealtite." Aluminum Core Light Weight Liquid-Tight Flexible Metal Conduit (LFMC). p. 1-1.

(Continued)

*Primary Examiner* — Angel R Estrada

(57) ABSTRACT

Systems and methods are provided for attaching flexible conduit to a fitting. Prongs of a conduit retention clip contact opposite sides of the flexible conduit in an aperture of the fitting. By aligning the prongs in grooves of the flexible conduit, the flexible conduit is held in place in the aperture of the fitting without sufficient compression to surpass the structural limits of the fitting.

18 Claims, 5 Drawing Sheets

(56) References Cited

OTHER PUBLICATIONS

"Flexible Metallic Conduit Fittings." Squeeze Type—Malleable Iron. pp. 1-3, Copyright 2015.
"Metal Clad/Armored Cable/Flex. Conduit and NM Cable Connectors." Cable and Flexible Cord Connectors. p. 1-1, Dec. 2007.

* cited by examiner

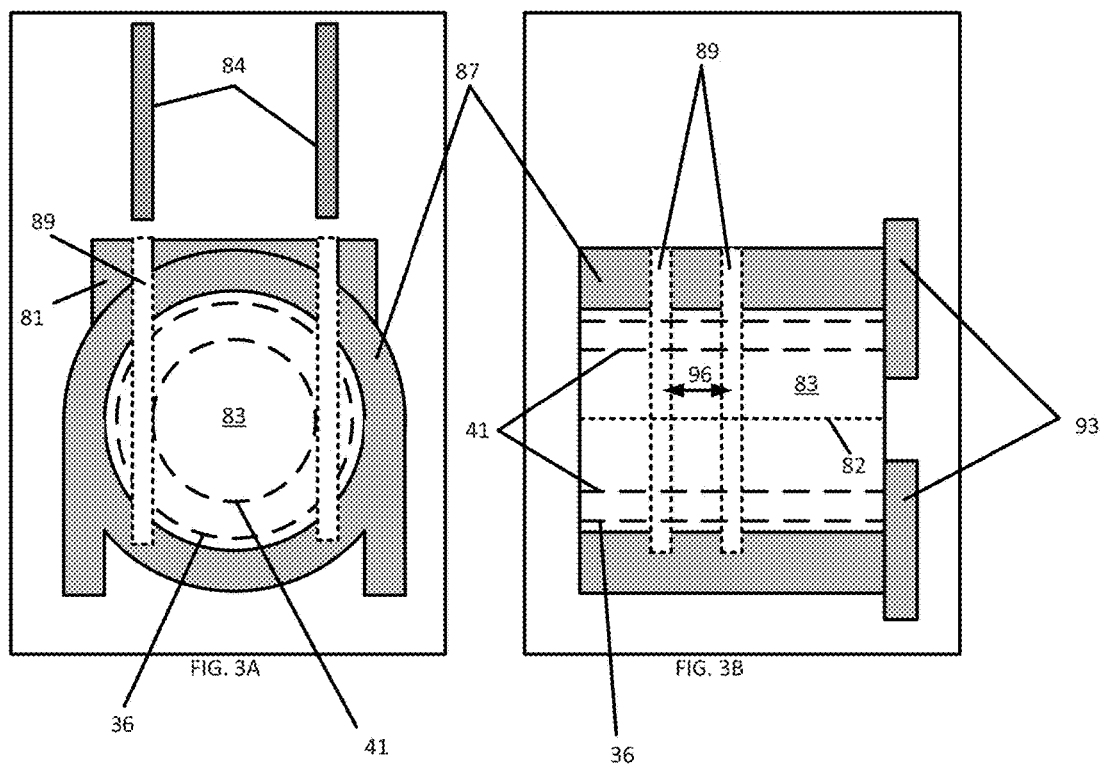

CLIP-BASED NON-METALLIC FITTINGS FOR ATTACHMENT OF FLEXIBLE METALLIC CONDUIT

TECHNICAL FIELD

Embodiments relate generally to fittings for flexible conduit.

BACKGROUND

Flexible conduit may be made by coiling a self-interlocking ribbed strip of material. The interlocking ribbed structure forms a tube that may bend or flex in multiple directions. The ability to bend allows for flexible conduit to be used in multiple applications where a rigid conduit may not be practical. Unlike rigid conduits, the flexible conduit may change its shape to match each installation or change as repairs are made. Wires are pulled through the tube and are thereby protected by the conduit from damage, both internal and external.

Flexible conduit may be attached to one or more terminals or junction boxes. The fitting between the flexible conduit and the terminal needs to be secure enough to withstand a steady pull so that the flexible conduit is unable to be removed by bending or flexing. For a metal on metal connection, a strap or compression based connection may be used. For a metal conduit and non-metallic terminal (e.g. plastic), a compression based connection may not be useful as the compression required to withstand a steady pull may surpass the structural limits of a non-metallic terminal. A new type of fitting is needed to attach flexible conduit to a terminal.

SUMMARY

A fitting and the use of the fitting with flexible conduit are provided. Prongs of a conduit retention clip contact opposite sides of the flexible conduit in an aperture of the fitting. By inserting the conduit retention clip through holes in the fitting with the prongs aligned to be in grooves of the flexible conduit, the flexible conduit is held in place in the aperture of the fitting. This arrangement may avoid sufficient stress to surpass the structural limits of the fitting.

In a first aspect, a flexible conduit fitting system is provided. The system comprises a conduit adapter and a conduit retention clip. The conduit adapter comprises a conduit aperture and two guide holes. The conduit aperture is configured to receive a flexible conduit. The conduit retention clip comprises two prongs configured to be inserted in the two guide holes.

In a second aspect, a system is provided for attaching a flexible conduit. The system comprises a conduit adapter, a first removable conduit retention prong, and a second removable conduit retention prong. The conduit adapter is configured to receive a flexible conduit having a minor diameter, a major diameter, and a pitch distance, into an aperture having a central axis. The first removable conduit retention prong is configured to be inserted into a first guide hole in the conduit adapter. The second removable conduit retention prong is configured to be inserted into a second guide hole in the conduit adapter. The first guide hole and second guide hole are located across the central axis of the aperture from one another. The first guide hole and second guide are separated by a distance greater than a minor diameter and less than a major diameter of the flexible conduit.

In a third aspect, a method is provided for attaching a flexible conduit to a conduit adapter. The method comprises inserting the flexible conduit having a minor diameter and a pitch distance into an aperture of the conduit adapter. The aperture has a central axis. Two prongs are inserted into two guide holes located across the central axis from one another. The two guide holes are separated by a distance greater than the minor diameter and less than the major diameter of the flexible conduit. The flexible conduit is held in place by the two prongs.

Other systems, methods, and/or features of the present embodiments will become apparent to one with skill in the art upon examination of the following figures and detailed description. It is intended that all such additional systems, methods, features and advantages be included within this description, be within the scope of the invention, and be protected by the accompanying claims. Additional features of the disclosed embodiments are described in, and will be apparent from, the following detailed description and the figures.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

FIG. 3A and FIG. 3B illustrate cross sections of an example non-metallic fitting for attachment of flexible metallic conduit.

DETAILED DESCRIPTION

In the following description, numerous specific details are set forth in order to provide a more thorough description of the present invention. It will be apparent, however, to one skilled in the art, that the present embodiments may be practiced without these specific details. In other instances, well-known features have not been described in detail so as not to obscure the invention.

An adapter is provided for attaching flexible conduit. The adapter secures the flexible conduit using a conduit retention clip. Due to the geometry of the flexible conduit and placement of the clip, the conduit retention clip axially constrains the flexible conduit to the adapter without over stressing the adapter.

Figure 1:
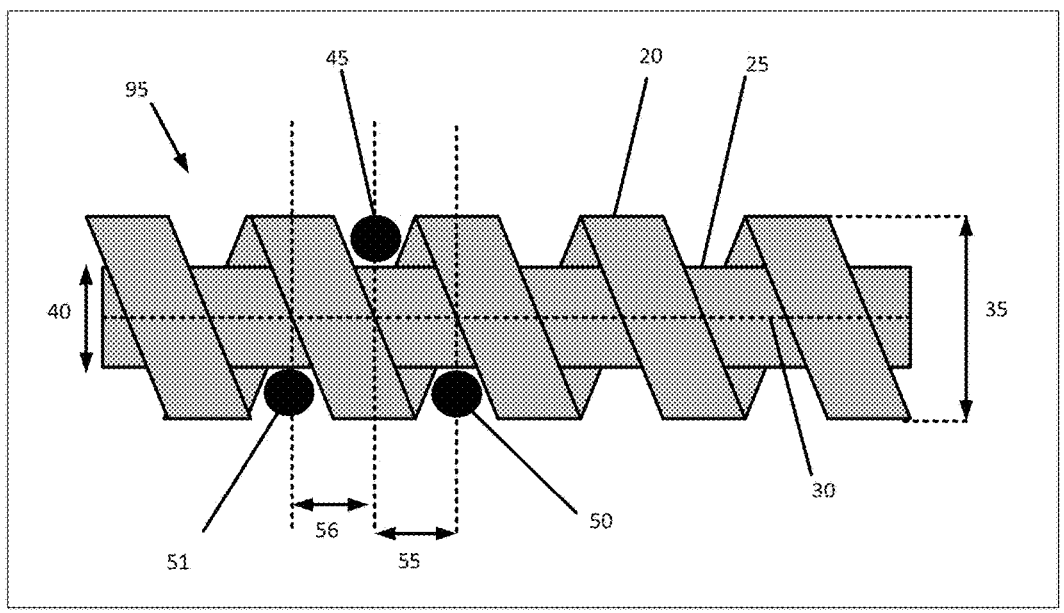
FIG. 1 illustrates an example segment of flexible conduit.

FIG. 1 illustrates an example of flexible conduit 95 depicted here as flexible metallic conduit 95 (FMC). FMC 95 may also be referred to as Greenfield or Flex and may be made of aluminum, steel, galvanized steel, or other material. Other types of flexible conduit, made of non-metallic materials such as plastic or rubber, may be used. FMC 95 may be formed from a self-interlocked strip that when interlocked, provides a ribbed tubular structure with a conduit central axis 30. FMC 95 has both ribs 20 and valleys 25. A valley 25 may refer to the area between the ribs 20 or the closest point to the center of the FMC 95. The ribs 20 or raised portions of the FMC 95 have a different profile than the valleys 25 of the FMC 95. As shown in FIG. 1, a diameter calculated perpendicularly from a rib to another rib is shown as distance 35 (referred to as the major diameter 35). A diameter calculated perpendicularly from a valley to a valley is shown as distance 40 (referred to as the minor diameter 40). The ribs 20 and valleys 25 of the FMC 95 are offset to one another in a spiral or helical pattern such that the ribs 20 are a continuous rib and the valleys 25 are a continuous valley.

The offset between the valleys 25 may be referred to as a pitch (or pitch distance 55). In FIG. 1, the pitch distance 55 is the lateral offset distance along the conduit central axis 30 between the two valleys 45 and 50. The pitch distance 55 may also be measured by using other similar features on opposing sides. A second pitch distance 56 or offset in an opposite lateral direction may be used. In FIG. 1, the second pitch distance 56 is illustrated as the offset from the valley 45 to the valley 51. Depending on the profile of the FMC, e.g. a width of the ribs 20 versus a width of the valleys 25, the pitch distance 55 and second pitch distance 56 may be equal or unequal.

Different types of FMC 95 may have different minor and major diameters depending on the amount of wires or cable the FMC 95 needs to carry. Different types of FMC 95 may have different pitch distances depending on the structure, the flexibility required, or the materials used.

FMC 95 may be used to provide protection for enclosed conductors from an impact or the environment. The enclosed conductors, e.g., wires or cables, may terminate at a junction box or a terminal. A junction box, for example, may serve as an enclosure for electrical connections between incoming wires from the FMC 95 and one or more electrical devices. Junctions or terminals may be formed from metal such as aluminum or steel or a non-metallic material such as plastic. A junction or terminal may have one or more fittings or adapters for attaching a segment of FMC 95. The fittings may be integrated into the junction box or may be a separate adapter and require an additional connection to the junction box. The fitting may be formed from a non-metallic material, such as injection molded plastic. Using injection molded plastic may be less expensive than using a metal component. However, a drawback for using non-metallic materials such as molded plastic is that the non-metallic material may be prone to cracking or failure when exposed to compression stresses. A metallic fitting may be stronger, harder, and more durable than, for example, a plastic counterpart. A metallic fitting may be able to flex or bend and maintain its structural strength while a plastic counterpart cannot. As such, in order to use a non-metallic fitting, precautions may be taken so as not to stress the fitting to failure. A known method of attaching FMC 95 to a junction by using a screw to compress the FMC 95 against the metallic fitting may not be possible for a non-metallic fitting. The stress on the non-metallic fitting required to hold the FMC 95 may deform a non-metallic fitting. A deformed non-metallic fitting may be prone to cracking or failure. Compression may also damage the FMC 95 or the wires enclosed. A screw driven directly on top of FMC 95 may puncture the FMC 95 and either damage the contents or break a seal allowing moisture or chemicals into the conduit.

Figure 2:
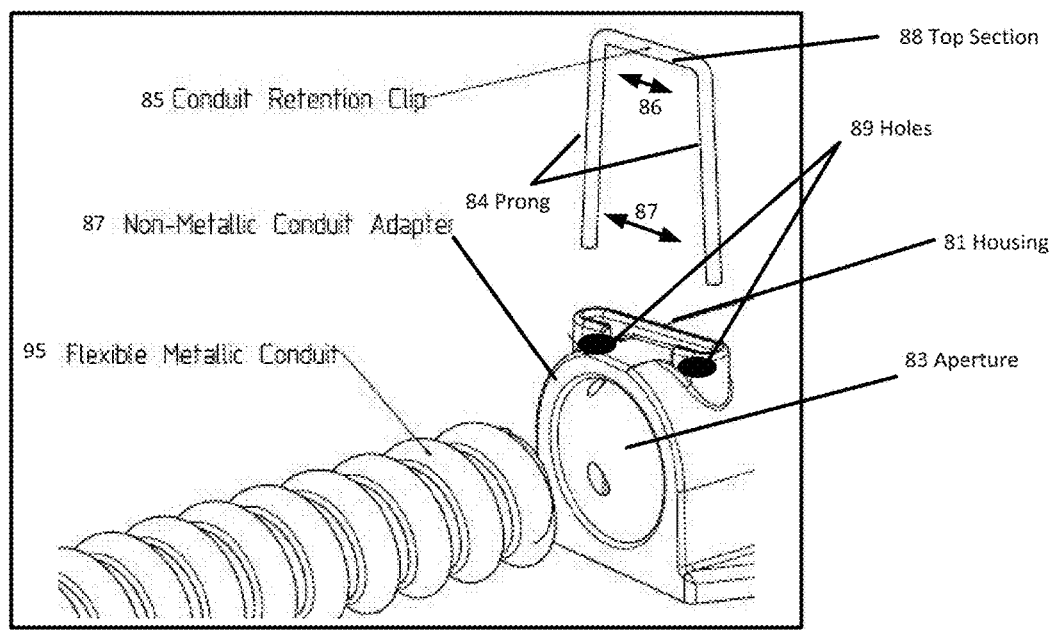
FIG. 2 illustrates an example apparatus of a non-metallic fitting for attachment of flexible metallic conduit.

FIG. 2 depicts an example apparatus for attaching FMC 95 to a fitting. The fitting includes a conduit adapter 87, which includes an aperture 83 configured to receive the FMC 95. The conduit adapter 87 includes two or more guide holes 89 (shown as exaggerated dots to better show placement). The guide holes 89 are configured by size and placement to receive a conduit retention clip 85. The guide holes 89 extend to and beyond the aperture 83, so the resulting exposed holes of only one guide hole 89 are shown in FIG. 2 due to the perspective view. The conduit retention clip 85 may be a separate piece from the conduit adapter 87. Additional, different, or fewer components may be provided.

The conduit adapter 87 may be formed from a non-metallic material. For example, the conduit adapter 87 may be plastic formed by an injected plastic molding process. Depending on the use, different types of plastic or polymers may be used to alter the rigidity and strength of the resulting plastic part. The conduit adapter 87 may be molded as a single part or as multiple parts that are subsequently fused or glued together. Certain portions of the conduit adapter 87 may be machined after the initial part is formed. For example, the guide holes 89 may be threaded using a boring machine, drilled using a press, punch, or thermal pin, or may be formed as part of the forming of the conduit adapter 87. Alternative processes may be used to form the conduit adapter 87, such as 3D printing. Alternative material may be used in the conduit adapter 87, such as rubber. The conduit adapter 87 may be formed from a metallic material.

FIG. 2 depicts a conduit adapter 87 with a round shape. The conduit adapter 87 may have multiple structural configurations. For example, the conduit adapter 87 may be rectangular or shaped as a square. Different sized conduit adapters 87 may be used for different sizes of FMC. An entrance of the aperture 83 of the conduit adapter 87 may be flush with a side of a junction box (e.g. the rest of the aperture embedded in the junction box). The conduit adapter 87 may extend outward as shown in FIG. 2. Two or more conduit adapters 87 may be connected or integrated into a junction box. The conduit adapter 87 may include a housing 81 for the guide holes 89. The housing 81 may be formed as part of the conduit adapter 87 or may be a separate part. The housing 81 may hold or contain the top section 88 of the conduit retention clip. As shown in FIG. 2, the housing 81 may extend outward from the conduit adapter 87. The conduit retention clip 85, once inserted, may be protected from the environment and any impacts.

The conduit adapter 87 may be integrated as part of a junction box. In such an embodiment, the conduit adapter 87 and junction box may be a single molded piece of plastic. Cost saving for material and incorporation of two separate parts may be achieved by not needing an additional part for conduit adaption, particularly in non-metallic junction boxes. Alternatively, the conduit adapter 87 may be connected to a junction box or terminal using a screw, tab, pin, or any other coupling mechanism. One or more arms or tabs with one or more holes may be provided for attachment to the junction box or terminal. Other structures may be used to attach the conduit adapter 87 to the junction box or terminal.

The conduit retention clip 85 may be configured (e.g., size and shape) to be inserted into the guide holes 89 in the conduit adapter 87. The conduit retention clip 85 may be formed from a metal, such as steel, or a non-metallic material, such as plastic. The conduit retention clip 85 may include a top section 88 and two prongs 84. The two prongs 84 may be parallel and perpendicular to the top section 88. The two prongs 84 may not be parallel. For example, in FIG. 2, the distance 87 between the prongs 84 at the ends of the prongs 84 away from the top section 88 may be larger than the distance 86 between the prongs 84 adjacent to the top section 88. The distance of the holes 89 that the prongs 84 are inserted into may be similar to the distance 86. As such, the two prongs 84 may be pinched together to fit into the two holes 89. Alternatively, the distance 87 is less than the distance 86 and the prongs 84 are spread apart for insertion into the holes 89.

The conduit retention clip 85 may be inserted through the aperture 83. The aperture 83 may have additional holes or indents for the ends of the prongs 84 to rest in (e.g., the bore of the holes 89 extends through the aperture 83 to provide two holes per prong 84 in the aperture 83. The prongs 84 of the conduit retention clip 85 may be elastic in that the prongs 84 attempt to return to an original shape. The outward pressure of the prongs 84 may hold the conduit retention clip 85 inside the guide holes 89.

The prongs 84 may not be flexible. The conduit retention clip 85 may be rectangular shaped with two parallel prongs 84 and a top of the conduit retention clip 85. The conduit retention clip 85 may be held in place by gravity or friction from the ribs of the FMC 95 and/or friction from a tight fit with the holes 89. The conduit retention clip 85 may be held in place by a cap, lid, or stop that prevents the conduit retention clip 85 from being retracted. The guide holes 89 may include a retainer to prevent the two prongs 84 from slipping out. For example, the guide holes 89 may contain a spring loaded ball like structure (or variant) that engages a hole in each of the prongs 84 as a detent holding the prong and clip in place.

In an embodiment, the two prongs 84 may be separate parts or pins (i.e., no top section 88). Each prong 84 may be inserted separately into the guide holes 89. Each prong 84 may be retained using a separate retention mechanism. For example, each prong 84 may be a sprung hairpin, a bobby pin, or a small clip. Each prong 84 may be a threaded screw that may be screwed into the guide holes 89. The guide hole 89 may be threaded to accept the prongs 84.

FIG. 3A and FIG. 3B depict cross sections of an example fitting for attachment of FMC 95. FIG. 3A depicts a cross-section view looking down the aperture 83 from an entrance of the aperture 83. FIG. 3A depicts the conduit adapter 87, the aperture 83, the housing 81, and two guide holes 89 into which the conduit retention clip 85 is inserted. The conduit retention clip 85 is depicted as two separate prongs 84 that may be inserted into the two guide holes 89. FIG. 3A further illustrates a minor circumference 41 relating to the minor diameter 40 of the FMC 95 and a major circumference 36 relating to the major diameter 35 of the FMC 95. The minor circumference 41 and the major circumference 36 help illustrate how the FMC 95 is secured by the conduit retention clip 85. Referring back to FIG. 1, the minor circumference (minor diameter 40) is related to the valleys, the major circumference (major diameter 35) is related to the ribs. The area between the minor circumference 41 and the major circumference 36 correspond to one or more valleys in the FMC 95 between the one or ribs. By placing the prongs 84 in the area, the FMC 95 is unable to move in and out of the aperture 83 due to each prong positioned between two ribs.

FIG. 3B depicts a view at different depths of a cross-section from a side of the apparatus (along the axis of the aperture 83 and through the axes of the holes 89). FIG. 3B includes the conduit adapter 87, the aperture 83, the two holes 89 for the conduit retention clip 85, and a portion of a junction box 93. The adapter 87 and junction box 93 may be a single molded part. FIG. 3B further illustrates an offset 96 between the centers of the two holes 89 laterally along a central axis 82 of the aperture 83. The offset 96 may correspond to the pitch distance 55 or second pitch distance 56 of the FMC 95 depending on which hole of the two holes 89 is closer to the entrance of the aperture 83. The two holes 89 and inserted two prongs 84 may be located offset to one another in order to secure the FMC 95. FMC 95 may have a spiral pattern of ribs and valleys. As illustrated in FIG. 1, the FMC 95 does not possess radial symmetry or bi-lateral symmetry. The two holes 89 may be offset at a similar angle to a pitch angle of the FMC 95. A pitch angle is an angle at which the FMC spiral pattern advances as the interlocking strips are connected. The inserted two prongs 84 are therefore offset along the axis of the aperture 83 to one another so that both prongs 84 may align with a valley of the FMC 95, thus securing the FMC 95 in place. The offset distance 96 may be similar to the pitch distance 55 of the FMC 95. The offset distance 96 may be similar to the pitch distance 55 plus one or more integer multiples of the distance of the spiral pattern (e.g. in FIG. 1, the distance between points 50 and 51 representing a complete pattern). Using one or more integer multiples of the distance of the spiral pattern, the offset distance 96 may allow a hole to skip a valley. "Similar" in this context allows for ¼ or less difference from the pitch distance 55. The pitch distance 55 may be the distance between two parallel lines drawn from two corresponding points on the FMC 95, e.g. the center of two opposing ribs as shown in FIG. 1. FIG. 3B further shows the minor circumference 41 and major circumference 36 of the FMC 95.

The aperture 83 may be sized to receive the FMC 95, so is about the size of the major diameter or circumference 36 or larger. "About" allows for a smaller diameter allowing for insertion with a friction fit. The aperture 83 may be circular or oval shaped. The size of the aperture 83 may be related to the size of the FMC 95. Different diameters of FMC 95 may use different sized apertures (and different sized adapters 87). In one embodiment shown in FIGS. 3A and 3B, the diameter of the aperture 83 is larger than a maximum diameter of the FMC 95. There is no maximum size of the aperture 83, however as the size increases, if the diameter of the FMC 95 does not increase, it may become difficult to align the prongs 84 with the valleys of the FMC 95.

At an end of the aperture 83 closer to the junction box 93, there may be a stop or part to limit the lateral movement of the FMC 95. For example, the FMC 95 may only be able to be inserted so far into the aperture 83 until the FMC 95 hits the stop or part.

The guide holes 89 may be configured to accept the conduit retainer. The guide holes 89 may be aligned so that when the conduit retention clip 85 is inserted, the prongs 84 of the conduit retention clip 85 are located in valleys (spaces between the ribs) of the FMC 95. The guide holes 89 may be parallel with one another or askew. The guide holes 89 may extend past the aperture 83 in order to anchor the bottom of the prongs 84, but may instead only extend into the aperture 83. FIGS. 3A and 3B show the guide holes 89 extending past the aperture 83 and partly into the opposite side of the adapter 87. In other embodiments, the guide holes 89 may extend completely through the adapter 87, such as to allow insertion of the prongs 84 from either of two directions. The guide holes 89 may include a retainer to prevent the prongs 84 from backing out of the holes 89.

Once inserted, the prongs 84 of the conduit retainer clip 85 are configured to capture the FMC 95 by being positioned tangentially to a valley of the FMC 95. The FMC 95 is thus unable to move in and out of the aperture 83 as the ribs of the FMC 95 are locked in place. Due to the geometry of the major diameter 35, minor diameter 40 and pitch of the FMC 95 and the adapter's offset retention features, the FMC 95 is captured on its minor diameter 40 in two places without compressing or deforming the adapter. The location of the conduit retainer clip eliminates the possibility of cracking the adapter. In alternative embodiments, the prongs 84 may compress the FMC 95 from opposing sides as and/or once inserted against the FMC 95.

Figure 4A:
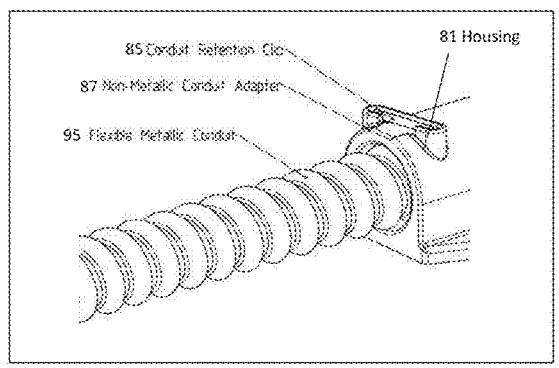
FIG. 4A and FIG. 4B illustrate perspective and cut-away views of an example non-metallic fitting flexible metallic conduit being held.
Figure 4B:
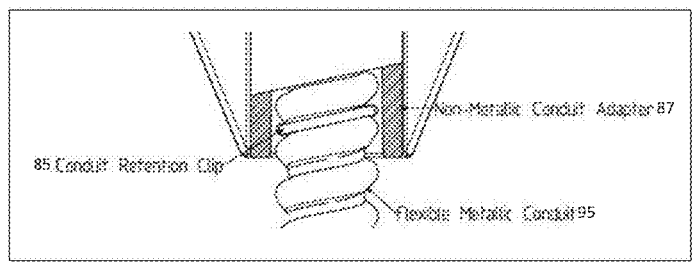

FIG. 4A and FIG. 4B depict example views of the apparatus of FIG. 2 with the FMC 95 being held in place. FIG. 4A includes the conduit adapter 87, the FMC 95, the housing 81 and the conduit retention clip 85. FIG. 4A depicts the FMC 95 inserted into the aperture 83 of the conduit adapter 87. FIG. 4A further depicts the conduit retention clip 85 inserted into the guide holes 89 (not shown) in the conduit adapter 87. The top section 88 of the conduit retention clip 85 fits inside of and is protected by the housing 81. As shown, the housing 81 allows for a level (e.g. head of a screwdriver) to be inserted underneath the top section 88 to pry out the conduit retention clip 85. Alternative structures for the housing 81 may be used. The housing 81 may include a removable cap that is placed over the inserted conduit retention clip 85. The housing 81 may be integrated into the conduit adapter 87 or may be a separate part.

FIG. 4B depicts a cut away, top-down view of the apparatus of FIG. 2. The FMC 95 has been inserted into the aperture 83 of the conduit adapter 87. The conduit retention clip 85 has been inserted into the guide holes 89 (not shown) in the conduit adapter 87. As shown, the prongs 84 of the conduit retention clip 85 are offset from one another in order to match the spiral pattern of the FMC 95. The inserted prongs 84 align with two of the valleys of the FMC 95 on opposite sides, preventing the FMC 95 from ejecting from the conduit adapter 87. The offset may be determined based on the pitch angle or pitch distance 55. The inserted prongs 84 may align with two opposing valleys that are closest one another, or the inserted prongs 84 may skip a valley on one side of the FMC 95.

Figure 5:
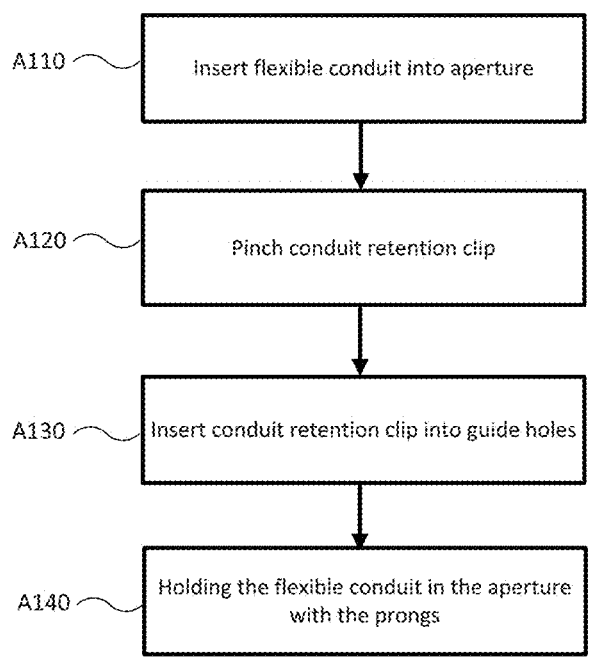
FIG. 5 is a flow diagram of one embodiment of a method for attaching a flexible metallic conduit using a non-metallic fitting.

FIG. 5 depicts a flow chart for attaching a FMC 95 using the apparatus of FIG. 2. Additional, different, or fewer acts may be provided. For example, act A120 may not be performed if the prongs 84 of the conduit retention clip 85 are parallel and configured to be inserted directly into the guide holes 89 without pinching or spreading.

At act A110, a segment of FMC 95 is inserted into an aperture 83 of a conduit adapter 87. The FMC 95 has a minor diameter 40, a major diameter 35, and a pitch distance 55 as described in FIG. 1. The minor diameter 40 corresponds to a distance that is calculated from a distance of an interior diameter plus the thickness of the FMC 95 (i.e., twice the wall thickness of the FMC 95). The major diameter 35 is the larger diameter that corresponds to the ribs or the outer diameter of the FMC 95. The pitch distance 55 corresponds to a lateral distance between opposing valleys. The pitch distance 55 may correspond to the lateral distance that a spiral pattern of the FMC advances over 180 degrees. The aperture 83 of the conduit adapter 87 about the or larger than the major diameter 35 of the FMC 95 so that the FMC 95 may be inserted into the aperture 83 without undue hassle.

The conduit adapter 87 includes at least two guide holes 89 that are configured to accept the respective prongs 84 of a conduit retention clip 85. The segment of FMC 95 may be inserted into the aperture 83 until two or more of the ribs of the FMC 95 have passed the two guide holes 89.

The conduit adapter 87 may include a stop to limit how far the FMC 95 may be inserted. For example, the conduit adapter 87 may be integrated into a junction box 93 that contains electrical connections. The junction box 93 may protect the wiring or cables and thus have no need for the FMC 95 to extend into the junction box 93. In certain embodiments, the conduit adapter 87 is used to support a length of FMC 95. The FMC 95 may be inserted through the aperture 83 until the region of FMC 95 that is to be supported is reached.

At act A120, the prongs 84 of the conduit retention clip 85 are pinched together. The conduit retention clip 85 may be configured to be elastic. The two prongs 84 of the conduit retention clip 85, for example, may spring back to a first shape if deformed. The two prongs 84 may be configured to push outwards on the guide holes 89 to hold the conduit retention clip 85 in the guild holes 89. The two prongs 84 may be shaped askew (not parallel) in a first shape. In the first shape, the guide holes 89 may not accept the prongs 84. However, when pinched, the prongs 84 may become parallel and thus be capable of insertion into the guide holes 89. In alternative embodiments, the prongs 84 may be spread instead of pinched to align with the guide holes 89.

At act A130, the conduit retention clip 85 is inserted into the two guide holes 89 so that the FMC 95 is held in place between the two prongs 84 of the conduit retention clip 85. The use of the conduit retention clip 85 does not overly compress the conduit adapter 87 or place stress on either the FMC 95 or the conduit adapter 87. Alternatively, some compression is provided.

At act A140, the conduit retention clip 85 (and the two prongs 84) hold the FMC in the aperture. When inserted after act A130, each of the prongs 84 of the conduit retention clip 85 may be located tangentially to the minor diameter 40 of the FMC 95. Due to the geometry of the major diameter 35, minor diameter 40 and pitch of the FMC 95 and the adapter's offset retention features, the FMC 95 is captured on its minor diameter 40 in two places by the prongs 84. The use of the conduit retention clip 85 eliminates the possibility of cracking the conduit adapter by over tightening a screw or other compression technique.

In order to release the FMC 95, the conduit retention clip 85 may be pulled out from the conduit adapter 87. The conduit retention clip 85 may be configured to have a lip or tab that may be grabbed. The housing 81 of the retention clip may provide a slot to place, for example, a flat head screwdriver to lever the retention clip 85 out of the adapter 87.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A flexible conduit fitting system comprising:
   a conduit adapter comprising:
   a conduit aperture configured to receive a flexible conduit, the conduit aperture having a central axis;
   two guide holes separated across the central axis from one another; and
   a conduit retention clip comprising two prongs configured to be inserted in the two guide holes and configured to engage on opposite radial sides of the flexible conduit,
   wherein the two guide holes in the conduit adapter are located so that the two prongs as inserted into the guide holes are located tangentially to a minor diameter of the flexible conduit inserted into the conduit aperture.

2. The flexible conduit fitting system of claim 1, wherein the two guide holes are offset along the central axis by a pitch distance of the flexible conduit.

3. The flexible conduit fitting system of claim 1, wherein the flexible conduit is flexible metallic conduit and the conduit adapter is a non-metallic conduit adapter.

4. The flexible conduit fitting system of claim 1, wherein the two prongs of the conduit retention clip are pinched together when in the two guide holes.

5. The flexible conduit fitting system of claim 1, wherein the conduit adapter is injection molded plastic.

6. The flexible conduit fitting system of claim 1, further comprising:
   a junction box configured to connect wires of one or more electrical devices to one or more wires contained in the flexible conduit.

7. The flexible conduit fitting system of claim 6, wherein the junction box and the conduit adapter are a single molded plastic part.

8. A system comprising:
   a conduit adapter configured to receive a flexible conduit having a minor diameter, a major diameter, and a pitch distance, into an aperture having a central axis;
   a first removable conduit retention prong configured to be inserted into a first guide hole in the conduit adapter; and
   a second removable conduit retention prong configured to be inserted into a second guide hole in the conduit adapter;
   wherein the first guide hole and second guide hole are located across the central axis of the aperture from one another and the first guide hole and second guide hole are separated by a distance greater than a minor diameter and less than a major diameter of the flexible conduit.

9. The system of claim 8, wherein the first guide hole and second guide hole are offset from one another along the central axis by the pitch distance of the flexible conduit.

10. The system of claim 8, wherein first removable conduit retention prong and second removable conduit retention prong are formed from a non-metallic material.

11. The system of claim 8, wherein the flexible conduit is flexible metallic conduit and the conduit adapter is injection molded plastic.

12. The system of claim 8, further comprising:
   a junction box configured to connect wires of one or more electrical devices to one or more electrical conductors contained in the flexible conduit.

13. The system of claim 12, wherein the junction box and the conduit adapter are a single molded plastic part.

14. The system of claim 8, wherein the first and second removable conduit retention prongs are connected by a top section as part of a retention clip;
   further comprising a housing to house the top section of the retention clip.

15. The system of claim 8, wherein the first removable conduit retention prong and second removable conduit retention prong are screws and the first guide hole and second guide hole are threaded.

16. A method for attaching a flexible conduit to a conduit adapter, the method comprising:
   inserting the flexible conduit having a minor diameter corresponding to valleys and a pitch distance corresponding to a lateral distance between the valleys into an aperture of the conduit adapter, the aperture having a central axis;
   inserting two prongs of a conduit retention clip into two guide holes located across the central axis from one another, the two guide holes separated by a distance greater than the minor diameter and less than the major diameter of the flexible conduit; and
   holding the flexible conduit in the aperture by the two prongs being in the valleys of the flexible conduit.

17. The method of claim 16, further comprising:
pinching, prior to inserting the two prongs, the two prongs together.

18. The method of claim 16, further comprising:
connecting wires of one or more electrical devices in a junction box to one or more electrical conductors contained in the flexible conduit.

* * * * *